United States Patent [19]

Vittorelli

[11] Patent Number: 4,847,885
[45] Date of Patent: Jul. 11, 1989

[54] SYSTEM FOR MEASURING AND AUTOMATICALLY COMPENSATING FOR THE DISTORSIONS OF A CONNECTION BETWEEN A TELEPHONE APPARATUS AND A CENTRAL VOICE PROCESSING UNIT

[75] Inventor: Vittore Vittorelli, Turin, Italy

[73] Assignee: Ing. C. Olivetti & C., S.p.A., Ivrea, Italy

[21] Appl. No.: 219,756

[22] Filed: Jul. 8, 1988

[30] Foreign Application Priority Data

Jul. 10, 1987 [IT] Italy ................................ 67592 A/87

[51] Int. Cl.⁴ ............................................. H04M 1/24
[52] U.S. Cl. .......................................... 379/6; 379/21; 379/24; 379/27
[58] Field of Search ................... 379/6, 16, 21, 22, 24, 379/27, 32, 89

[56] References Cited

U.S. PATENT DOCUMENTS 4,401,860  8/1983  Walls ........................................ 379/6

Primary Examiner—Stafford D. Schreyer
Attorney, Agent, or Firm—Banner, Birch, McKie & Beckett

[57] ABSTRACT

The central unit (14) comprises a distortion sampler (16) including a spectral sound analyzer and a memory for recording the digital data of at least one reference sound. The central unit by means of the analyzer analyzes a sequence of such sounds which are received by way of the telephone line (11, 13) and makes a comparison with the recorded data. It thus produces a measurement of the frequency response of the transmission, that is to say distortion and attenuation introduced by the telephone connection, in accordance with the various frequencies. The data of that measurement are used by the central unit (14) to compensate for the signals which are successively received by way of the activated telephone connection. The system comprises a portable acoustic device (35) in which the digital data of the reference sound are recorded. That device may be connected to any telephone apparatus (12) of the network and comprises a manual control for triggering transmission to the central unit (14) of the sequence of reference sounds after the telephone connection has been established by means of the telephone apparatus (12). The portable device (35) may also have a recording of a code for identifying the user, for example, for use in a vocal postal system. In addition in a system in which the central unit (14) comprises a voice recognition device (17) the portable device (35) may have the recording of a series of phonetic prototypes, or phonemes, which are specific to the particular user, to be transferred to the central unit to improve the quality of recognition of the speech transmitted thereby. Alternatively the phonemes of different users may be recorded in a memory of the central unit (14) and be selected thereby on the basis of identification code.

21 Claims, 3 Drawing Sheets

4,847,885

SYSTEM FOR MEASURING AND AUTOMATICALLY COMPENSATING FOR THE DISTORSIONS OF A CONNECTION BETWEEN A TELEPHONE APPARATUS AND A CENTRAL VOICE PROCESSING UNIT

BACKGROUND OF THE INVENTION

1. Field of the Invention

The present invention relates to a system for measuring and automatically compenating for the distortions of a connection between a telephone apparatus and a central voice processing unit, as defined in the introductory portion of claim 1.

The invention may be applied to a telephone network in which the users may deposit voice messages in digital form, for example for a vocal postal system.

2. Description of the related art

Systems for the digital storage of messages are known, which may be selected by passing to the central unit digital codes which are generated for example by a terminal provided with a numeric keyboard and a display. The selected message is then converted into vocal form by means of a text-speech converter and passed to the caller by way of the telephone connection.

As is known, telephone connection systems are subject to some factors which cause distortion and degrading of the quality of the transmission, both because the signal transmitted is limited in frequency, so that there is a loss in respect of the information available at the source, and because the microphone and the telephone lines have a certain frequency response curve which may vary from one apparatus to another and from one line to another, and because the connection always superimposes a certain level of noise on the transmitted signal.

SUMMARY OF THE INVENTION

The object of the present invention is to provide an apparatus capable of improving the quality of the response of the central unit by telephonic means, automatically compensating for the distortion effects which are introduced in the connection between the telephone apparatus and the central voice processing unit.

This object is met by a system according to the invention for measuring and automatically compensating for the distortions of a connection between a telephone apparatus and a central voice processing unit for a telephone network comprising at least one telephone line wherein the central unit comprises measuring means which are activable after a telephone connection has been established on the said line for measuring the distortion introduced in the transmission by the telephone line, and compensation means controlled by the measuring means for compensating for the distortion.

In particular the system according to the invention may comprise a portable acoustic device capable of being connected to any telephone apparatus of the network, being provided with a memory for recording a sereis of digital data corresponding to a sequence of reference sounds for calibration of the connection, and a converter for converting these data into the corresponding reference sounds.

These and other features of the invention will be more clearly apparent from the following description of a preferred embodiment which is given by way of non-limiting example with reference to the accompanying drawings.

DESCRIPTION OF THE PREFERRED EMBODIMENT

Figure 1:
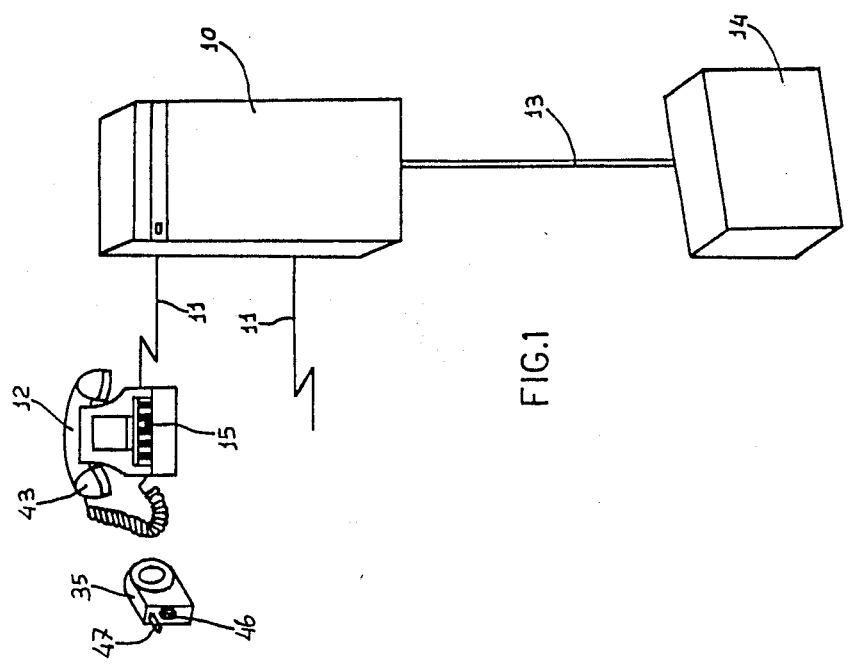
FIG. 1 is a general diagrammatic view of a telephone connection incorporating a system for measuring and automatically compensating for line distortion in accordance with the invention.

Referring to FIG. 1, reference numeral 10 generally indicates a telephone exchange, for example an exchange for private networks, commonly known as a PABX, which is capable of operating a plurality of telephone lines 11 connected to other user telephone apparatuses 12. Also connected to the PABX 10 by means of a cable 13 for transmission of speech in analog form is a central voice processing unit 14 capable of storing messages in digital form and processing them and selecting them for re-transmission.

The apparatuses 12 may be of the multi-tone type, that is to say they are such as to control the selection of the user called and other functions of the connection by means of a series of acoustic signals of various frequencies. Those acoustic signals may be generated by actuating the numeric keys of the usual keypad 15 or by means of codes recorded in a suitable memory. The central unit 14 comprises a unit for measuring and compensating for the distortion of the connection, being generally indicated by reference numeral 16 (see FIG. 2), which will be described in greater detail hereinafter.

The central unit 14 may also comprise a device 17 (see FIG. 2) for phonetic speech recognition, for example of the type described in our published patent application EP-A No. 0 108 609. Also connected to the central unit 14 is a mass storage means, for example, formed by a magnetic disk reading and recording unit 18. In such a case the central unit 14 comprises a processor or CPU 19 (see FIG. 3) capable of providing control for the recognition device 17 under the control of a suitable program recorded in a read only memory (ROM) 25. The device 17 includes a sampler 21 and a spectrum analyser formed by a series of digital band pass filters 20. The signals emitted by the filters 20 are first converted into digital values by an A/D converter 22 and then analysed and compared with a series of sample phonemes recorded in a phoneme memory 23.

The central unit 14 may also comprise a synthesiser 26 for converting digital data into corresponding sounds to be transmitted by way of the cable 13, the PABX 10 and the line 11 to the connected telephone apparatus 12.

In accordance with another application the central unit 14 may be included in a voice postal system in which the received messages are recorded under the control of the CPU selectively in certain postboxes of the mass storage means 18. Those messages can be subsequently selected by the calling user, for example by means of an identification number.

The unit 16 comprises means for measuring the distortion introduced in the transmission by the telephone communication. Such measuring means comprise a permanent memory 27 (see FIG. 3) formed by a first region of a read only memory or ROM 28 in which there is recorded a series of digital data corresponding to one or more reference sounds. Such data include an item of data which is indicative of the level of energy of a series of bands of frequencies contained in the reference sound. A second region 29 of the ROM 28 may be recorded with a suitable program to permit a microprocessor 30 to carry out the above-mentioned measurement operation, the results of which are recorded in a memory (RAM) 34, as will be described in greater detail hereinafter.

The measuring means further comprise a spectral sound analyser 31 formed by an analog-digital converter 32 and a bank of filters 33. Each filter 33 is made active by the microprocessor 30 to isolate the frequency band of a sound from all the other bands of frequencies and to emit a digital sound indicative of the energy or level of the sound which is filtered in that way.

The measuring and compensating system also comprises means for transmission of the sequence of reference sounds for automatically transmitting said sounds as soon as the connection between a telephone apparatus 12 and the central unit 14 is established. Preferably such transmission means comprise a portable acoustic device 35 (see FIGS. 1 and 2), which is preferably of pocket size, for example an electromagnetic or acoustic coupler known per se which is capable of being connected or coupled to any telephone apparatus 12 of the network for transmission on the line 11. The device 35 essentially comprises a microprocessor 36 (see FIG. 4) which can be controlled for a transmission operation by a program recorded in a first portion 37 of a ROM 38.

Another portion 39 of the ROM 38 on the other hand is recorded with a series of digital data corresponding to the above-mentioned reference sound and thus identical to the data recorded in the region 27 of the ROM 28 (see FIG. 3) of the unit 17. The recorded reference sound comprises various frequencies. The reference sound is transmitted a predetermined number of times alternately with periods of silence. It is also possible to use and transmit a predetermined sequence of sounds with different spectral characteristics.

The device 35 (see FIG. 4) also comprises synthesiser 41 which is capable of generating the corresponding reference sound for each series of data which are recorded in the portion 39 of the ROM 38. That sound is amplified by an amplifier 42 to a preset level to be transmitted by way of a transmitter 40 which can be coupled to the microphone 43 of the telephone apparatus 12 (see FIG. 1) after the connection to the central unit 14 has been established.

The device 34 (see FIG. 4) further comprises a battery power supply 44 for operation thereof and a single manual control member formed by a key 46. The latter is operable to activate the microprocessor 36 for sequentially reading the data of the reference sound which are recorded in the portion 39 of the ROM 36. Finally the device 35 comprises a visual indicator 47 which is formed for example by an LED which is controlled by the microprocessor 36 in such a way as to remain illuminated throughout the operation of reading the ROM 38.

In order to effect compensation of distortion and background noise which are introduced by the line 11 (FIG. 11), the user, by means of the usual keypad 15 of the telephone apparatus 12, first makes a telephone connection to the central unit 14. The user then couples the device 35 to the microphone 43 and actuates the key 46. The microprocessor 36 (see FIG. 4) then carries out, in the portion 39 of the ROM 38, the operation of reading the data relating to the reference sound.

Those data, by way of the synthesiser 41 and the amplifier 42, repeatedly generate the reference sound which is spaced by periods of silence.

Figure 5:
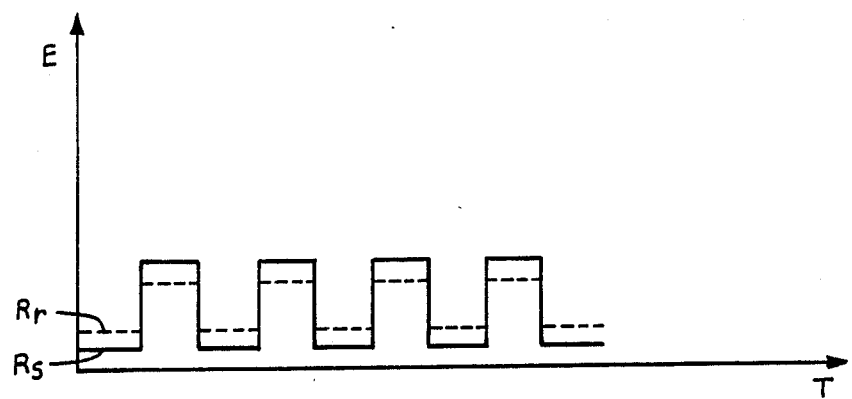
FIG. 5 is a diagram illustrating the energy of the background noise and the energy of the various frequencies of the acoustic signal in the connection.

The sound which is generated in that way is transmitted by way of the line 11, the PABX 10 and the cable 13 to the central unit 14 at which they arrive with a certain amount of distortion or attenuation and with the addition of a background noise. The microprocessor 30 of the unit 16 (see FIG. 3), under the control of the program from the region 29 of the ROM 28, now activates the various filters of the array 33, producing the digital data in respect of the levels of energy of the noise received and the various frequencies of the sound. The microprocessor 30 also compares the data obtained in that way to the corresponding data recorded in the memory 27, recording the result of that comparison in the registers of the operational memory 34. The diagram in FIG. 5 indicates in continuous line the theoretical levels of energy of the noise and the sound which is analysed at successive time intervals. It also shows in broken lines the level of energy of the noise received and the sound received.

Figure 6:
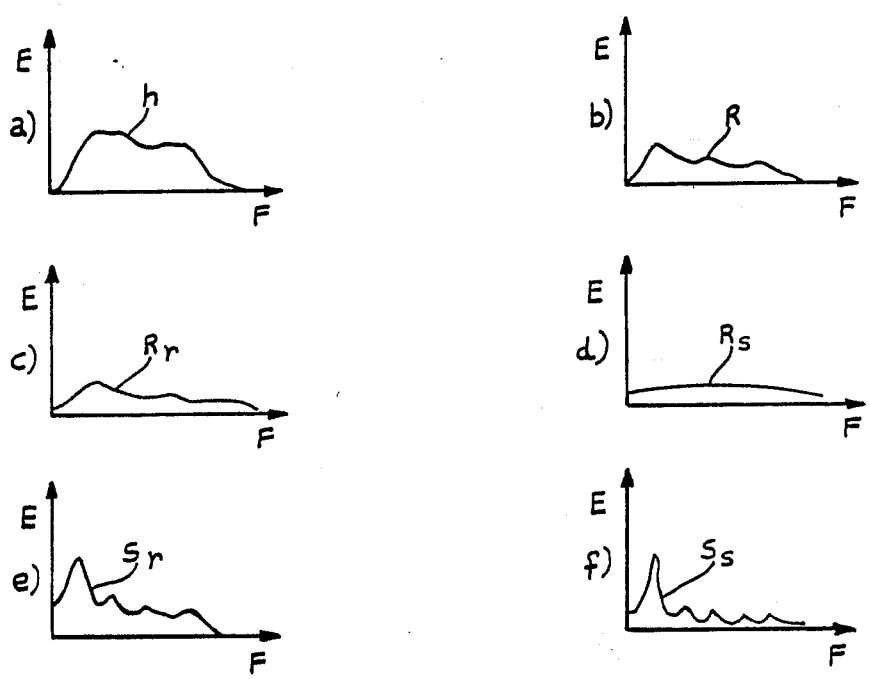
FIG. 6 shows a series of diagrams illustrating the compensation system.

In particular the microprocessor 30 is controlled by the program recorded in the region 29 of the ROM 28, being capable of producing, in dependence on the frequency, a line transfer function h (FIG. 6a), which is an unknown, and the noise spectrum R (FIG. 6b) which is introduced by the line 11, which is another unknown. That program comprises an algorithm such as to resolve the following system of equations:
$R_r = hR_s + R; S_r = hS_s + R$.

Figure 3:
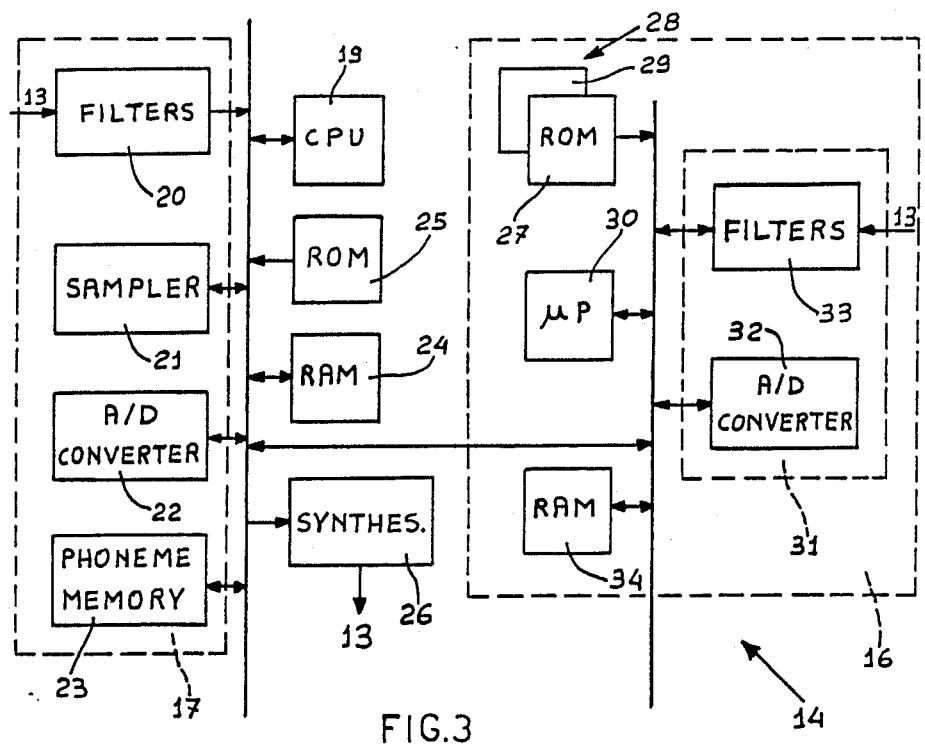
FIG. 3 is a block diagram of a central unit for compensating for the distortion.
Figure 4:
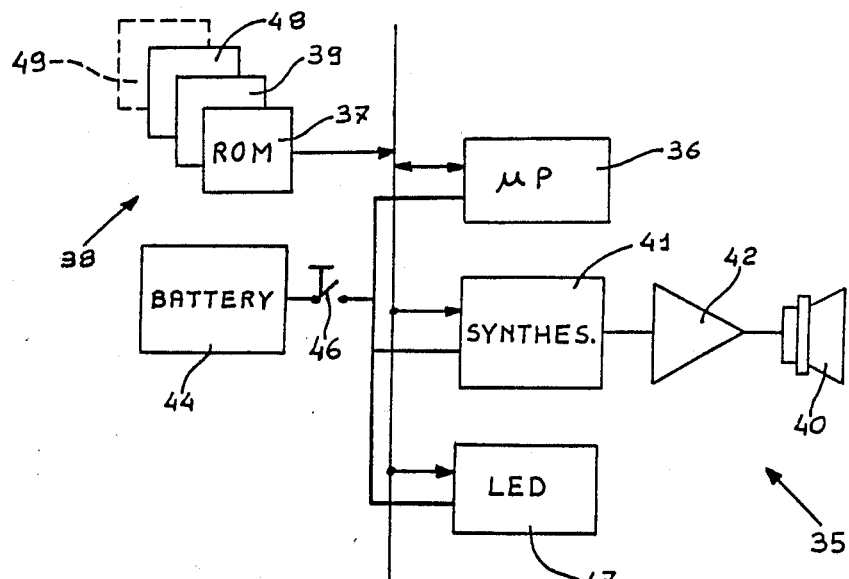
FIG. 4 is a block diagram of a portable acoustic device for predisposing for compensation of the distortion.

In those operations $R_r$ (FIG. 6c) and $R_s$ (FIG. 6d) respectively represent the energy (FIG. 5) of the noise received by the unit 16 (FIG. 3) and that of the noise emitted by the transmitter 40 (see FIG. 4) while $S_r$ (FIG. 6e) and $S_s$ (FIG. 6f) respectively represent the energy of the spectrum of the signal of the sound received by the unit 16 (FIG. 3) and that of the spectrum of the signal transmitted by the transmitter 40 (FIG. 4). The microprocessor 30 repeats the program for the various bands of frequencies represented in the spectra of the diagrams in FIG. 6 and can thus define in digital form the frequency response curve of the telephone connection and the noise generated thereby.

The result which is defined in that way is recorded in the registers of the memory 34 and is subsequently used by the microprocessor 30 during transmission by way of the same telephone line in order to compensate for distortion therein. For that purpose the microprocessor 30 is connected to the CPU 19 whereby in the subsequent transmission phases there is a reduction in a cause of uncertainty in respect of automatic speech recognition and the quality of the service in voice recognition and/or vocal post applications is improved.

In accordance with another aspect of the invention the ROM 38 (FIG. 4) of the portable device 35 comprises another region 48 in which there is recorded a distinctive identification code for the individual device 35, which is thus distincitive of its bearer user. The program recorded in the region 37 of the ROM 38 is such as to condition the microprocessor 36 to transmit the identification code to the central unit 14 (FIG. 3) immediately after the region 39 of the ROM 38 has been read. That code is recognised by the CPU 19 of the central unit 14 which then permits the other operations envisaged for the connection.

Figure 2:
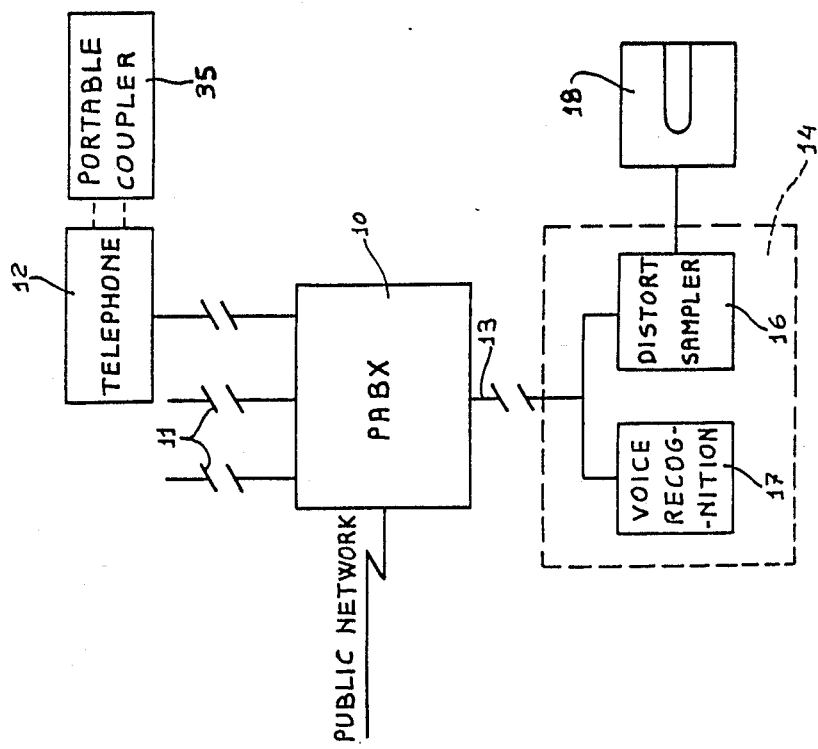
FIG. 2 is a block diagram of a portable acoustic device for calibration of the telephone connection.

The identification code may also be distinctive of a corresponding voice post box of a disk unit 18 (see FIG. 2). The central unit 14, after the recognition phase, may then control the disk unit 18 (see FIG. 2) in such a way as to transmit to the user the messages contained in the corresponding voice post box or to transfer same to a voice post box of another user by coupling it to the name corresponding to that identification code, as the sender.

Reception of the new message by the central unit 14 is compensated with the data in respect of distortion and the noise which are received from the measurement operation previously carried out, for the characteristics of the line 11 which is active at that time, by the microprocessor 30, and recorded in the RAM 34 of the compensation unit 16. In that way the user who is the bearer of the device 35 may interrogate his voice post box by way of any telephone apparatus 12 (see FIG. 2) of the network and possibly by way of a telephone apparatus of a public network which is outside the PABX 10 to which the PABX 10 is connected. In that case the compensation effect produced by the central unit 14 also takes account of the distortion and the noise introduced into the transmission by the connection between the PABX 10 and the outside telephone apparatus.

In a system in which the central unit 14 comprises the voice recognition device 17, for the purposes of improving speech recognition, the memory 23 of the device 17 (see FIGS. 3 and 4) may contain in different sections an archive record of the prototypes and phonemes relating to each user. The CPU 19, in response to recognition of the identification code sent by the device 35, then selects the corresponding section of the memory 23. Comparison of the message to be recorded is then effected with the relevant prototypes of the specific user whereby voice recognition will be of the "speaker dependent" type and is thus more precise.

Alternatively the recognition device 17 may be provided with a collection of phonetic prototypes which are recorded in the memory 23 and which represent with some degree of approximation a vast population of different voices. In that case codes suitable for identifying the user voice are recorded in a section 49 of the ROM 38 of the portable device 35. Those codes are transmitted to the central unit 14 after the user identification code and enable the CPU 19 to select from the memory 23 the prototypes to be used for recognition of the speech transmitted from that particular user.

In such "speaker dependent" speech recognition situations, before the recognition operation the central unit 14 may compensate for reception of the voice message with the data in respect of distortion and noise introduced by the telephone connection and received following reading of the region 39 of the ROM 38 of the portable device 35. Alternatively the central unit 14 may vary the prototypes and the phonemes selected in the memory 23, in accordance with such data.

In accordance an alternative embodiment, in a system comprising the voice recognition device 17, the section 49 of the ROM 38 of the portable device 35 may be recorded with a series of phonetic prototypes formed by words or syllables or a series of simple phonemes originally pronounced by the specific user bearing the device 35. After the identification code for the section 39 has been transmitted to the central unit 14, the microprocessor 36 causes the recording of the prototypes or the phonemes in the section 49 of the ROM 38 to be transferred to the memory 23 of the central unit 14. In that way the recognition device 17 can be adapted to the voice of the user carrying the device 35, without the necessity to have recourse to phonetic prototypes which pre-exist in the device 17, whereby the CPU 19 performs comparison of the phonetic prototypes or phonemes received with the phonetic prototypes originating from the specific bearer user. In that case the central unit 14 provides a compensation effect which takes account only of the item of data supplied by the noise, which is used to establish the silence-voice separation threshold.

Various modifications and improvements may be made in the above-described compensation system without thereby departing from the scope of the invention. For example the CPU 19 and the microprocessor 30 of the central unit 14 may be replaced by a single common processor and the two memories 24 and 34 may be replaced by a single RAM. In addition the memory 23 may be replaced by a section of ROM. Similarly the array of filters 33 and the converter 32 may be part of the filters 20 and the converter 22 of the recognition device 17. Finally the central unit 14 may be formed by a personal computer in which boards are fitted to perform the functions of the units 16 and 17.

I claim:

1. A system for measuring and automatically compensating for the distortions of a connection between a telephone apparatus (12) and a central voice processing unit (14) for a telephone network comprising at least one telephone line (11), characterised in that the central unit (14) comprises measuring means (16) which are activatable after a telephone connection has been established on the said line (11), for measuring the distortion introduced in the transmission by the telephone line, and compensation means (30, 34) controlled by the measuring means (16) for compensating for the distortion.

2. A system according to claim 1, characterised in that the measuring means (16) comprise a memory (27) for recording a series of theoretical digital data relating to analysis of a sequence of reference sounds, a spectral sound analyser (21) for converting the sounds received into a series of effective digital data, and means (30) for comparing the theoretical digital data with the effective digital data obtained by the spectral analyser (31) upon the reception of a sound corresponding to the reference sound by way of the telephone line (11).

3. A system according to claim 2, characterised by means (35) for transmission of a sequence of reference sounds co-operating with the telephone apparatus (12) for transmitting the said sequence of sounds after the telephone apparatus (12) has established the telephone connection to the central unit (14).

4. A system according to claim 3, characterised in that the transmission means (35) comprises a memory (39) for recording the theoretical digital data, and a converter (41) for converting this data into the corresponding reference sounds.

5. A system according to claim 3 or 4, characterised in that the transmission means (35) comprise a portable acoustic device capable of being connected to any telephone apparatus (12) of the network, the portable device comprising a manual control member (46) for causing reading of the memory (39) and generation of the sequence of reference sounds which are then transmitted by means of the telephone apparatus (12) to which it is connected.

6. A system according to claim 5, characterised in that the portable device (35) comprises means (48) for signalling to the central unit (14) the identity of the portable device independently of the telephone apparatus to which it is connected.

7. A system according to claim 6, characterised in that the signalling means comprise an identification code recorded in the memory (48) and capable of being recognised by the central unit (14).

8. A system according to claim 6 characterised in that the portable device (35) is an acoustic or electromagnetic coupler which can be coupled to the microphone (43) of the telephone apparatus (12).

9. A system according to any of claim 6 wherein the central unit (14) is capable of controlling a voice post installation comprising for each user a post box (18) in which the voice messages addressed to the respective user can be recorded in digital form, characterised in that the central unit (14) is conditioned by the identification code to select the respective post box (18) in such a way as to make the voice message recorded therein available at the telephone apparatus (12) to which the portable device (35) is connected.

10. A system according to claim 2 characterised in that the spectral analyser (31) comprises an array of band pass filters (33), each being capable of isolating a corresponding frequency range, the measuring means (16) being capable of producing a curve in respect of the frequency response of the telephone line.

11. A system according to claim 10, characterised in that the sequence of reference sounds includes at least one period of silence, the measuring means (16) also being capable of measuring the strength of the noise generated by the line (11).

12. A system according to claim 11, characterised in that the compensating means (30, 34) are controlled by the measuring means (16) in such a way as to compensate both for the noise introduced by the telephone line (11) and the level and the frequency characteristics of the received sound.

13. A system according to claim 12, characterised in that the central unit (14) is capable of calculating both the energy of the noise received and the variation in energy of the acoustic level in each frequency of the sound received, the energy of the noise and the variation being stored (34) for the duration of the connection and being used to reconstruct the transfer function of the telephone line (11) during the connection.

14. A system according to claim 7, characterised in that the central unit (14) comprises a voice recognition device (17) having a memory (23) recorded with a series of phonetic prototypes to be compared to the signals of the received message, the compensating means (16) being capable of modifying the phonetic prototypes or the signals of the message received.

15. A system according to claim 14, characterised in that the phonetic prototypes are stored in the memory (49) of the portable device (35) and are transmitted to the recognition device (17) after the transmission of the identification code.

16. A system according to claim 14, characterised in that the memory (23) of the recognition device is recorded in separate regions with the phonetic prototypes of the various users, the central unit (14) being conditioned by the identification code to select on each occasion for the analysis of a message the memory region in which the phonetic prototypes corresponding to that identification code are recorded.

17. A system according to claim 14, characterised in that the memory (23) of the recognition device (17) is recorded with the phonetic prototypes of a plurality of voices, the central unit (14) being conditioned by the identification code to select on each occasion for analysis of a message the phonetic prototypes to be used for the user identified in that way.

18. A portable device (35) capable of being acoustically or electromagnetically coupled to a telephone apparatus (12) of a telephone network incorporating the compensation system according to claim 1 characterised in that the device (35) comprises a memory (39) recorded with the said digital data and a converter (41) for converting this data into the corresponding reference sounds.

19. A device according to claim 18, characterised in that it comprises a single control member (46) for causing reading of the memory (39).

20. A device according to claim 18 characterised in that the memory (39, 48) of the device (35) is also recorded with an identification code identifying the user carrying the device.

21. A device according to claim 18, characterised in that the memory (39, 49) of the device (35) is also recorded with a series of data corresponding to phonemes originally pronounced by the user of the device.

* * * * *